US007340478B2

(12) United States Patent
Hambrick et al.

(10) Patent No.: US 7,340,478 B2
(45) **Date of Patent: *Mar. 4, 2008**

(54) METHOD AND APPARATUS FOR IMPLEMENTING CONTAINER MANAGED USES, OWNERSHIPS, AND REFERENCES IN AN ENTERPRISE JAVABEAN ENVIRONMENT

(75) Inventors: Geoffrey Martin Hambrick, Round Rock, TX (US); Robert Howard High, Jr., Round Rock, TX (US); Rodney Alan Little, Wappingers Falls, NY (US); Sridhar Sudarsan, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 249 days.

This patent is subject to a terminal disclaimer.

(21) Appl. No.: 11/030,851

(22) Filed: Jan. 7, 2005

(65) Prior Publication Data

US 2006/0155744 A1 Jul. 13, 2006

(51) Int. Cl.
*G06F 17/30* (2006.01)

(52) U.S. Cl. .................... 707/102; 707/100; 715/501.1

(58) Field of Classification Search ..................... None
See application file for complete search history.

(56) References Cited

U.S. PATENT DOCUMENTS

| | | | | |
|---|---|---|---|---|
| 5,287,447 | A | 2/1994 | Miller et al. | 395/157 |
| 5,809,506 | A | 9/1998 | Copeland | 707/103 |
| 5,930,480 | A | 7/1999 | Staats | 395/200.74 |
| 5,948,065 | A | 9/1999 | Eilert et al. | 709/226 |
| 5,995,975 | A | 11/1999 | Malcolm | 707/103 |
| 6,269,373 | B1 | 7/2001 | Apte et al. | 707/10 |
| 6,507,948 | B1 | 1/2003 | Curtis et al. | 717/174 |
| 6,513,040 | B1 | 1/2003 | Becker et al. | 707/10 |
| 6,591,272 | B1 | 7/2003 | Williams | 707/102 |
| 6,638,315 | B2 | 10/2003 | Uppiano et al. | 715/513 |
| 6,681,232 | B1 | 1/2004 | Sistanizadeh et al. | 707/104.1 |
| 6,704,805 | B1 | 3/2004 | Acker et al. | 709/315 |

(Continued)

FOREIGN PATENT DOCUMENTS

| | | |
|---|---|---|
| WO | WO 01/67289 A2 | 9/2001 |
| WO | WO 02/077814 A2 | 10/2002 |

OTHER PUBLICATIONS

V. Gannamani, "Building a J2EE Application with EJB's in JBOSS Servers", M.S. Tech, Division of Computing Studies, Arizona State University, East, Mesa, Arizona, pp. 1-9.

(Continued)

*Primary Examiner*—Jeffrey Gaffin
*Assistant Examiner*—Raheem Hoffler
(74) *Attorney, Agent, or Firm*—Duke W. Yee; Diana R. Gerhardt; Mari A. Stewart

(57) ABSTRACT

A method, apparatus, and computer instructions are provided for implementing container managed uses, ownerships, and references in an enterprise JavaBean™ environment. A user may specify a uses, ownership, reference relationships between entity beans and sessions in a deployment descriptor file. When the file is processed, the present embodiment generates methods on the entity beans and allows the container to recognize the relationships, such that the user may access the session beans based on the specified relationships.

1 Claim, 12 Drawing Sheets

U.S. PATENT DOCUMENTS

| | | | | |
|---|---|---|---|---|
| 6,721,789 | B1 | 4/2004 | DeMoney | 709/219 |
| 6,728,750 | B1 | 4/2004 | Anderson et al. | 709/201 |
| 6,742,175 | B1 | 5/2004 | Brassard | 717/107 |
| 6,752,836 | B1 | 6/2004 | Copeland et al. | 709/102 |
| 6,754,659 | B2 | 6/2004 | Sarkar et al. | 707/10 |
| 6,801,938 | B1 | 10/2004 | Bookman et al. | |
| 6,892,382 | B1 | 5/2005 | Hapner et al. | |
| 2003/0182457 | A1 | 9/2003 | Brewin | 709/310 |
| 2004/0088687 | A1 | 5/2004 | Dalton et al. | 717/141 |
| 2004/0172613 | A1 | 9/2004 | Gallagher | 717/108 |
| 2004/0172614 | A1 | 9/2004 | Gallagher | 717/108 |
| 2006/0053087 | A1* | 3/2006 | Pavlov | 707/1 |
| 2006/0143223 | A1* | 6/2006 | Ivanova | 707/103 R |
| 2006/0143224 | A1* | 6/2006 | Simeonov | 707/103 R |
| 2006/0155745 | A1* | 7/2006 | Hambrick et al. | 707/102 |

OTHER PUBLICATIONS

R. Castagnaro, "Making it Happen with J2EE", SyncTank Solutions, Inc., 2000, pp. 1-32.

"Darwin Executive Guides—Customer Relationship Management", http://guide.darwinmag.com/technology/enterprise/crm/, pp. 1-8.

"Introduction to Enterprise Java Beans (EJB2.0)", Sun Educational Services, Sun Microsystems.

Johnson, Enterprise Java Technologies Tech Tips, HTTP://java.sun.com/developer/EJTechTips/2002/tt1210.html, Dec. 10, 2002, pp. 1-7

Stearns, Enterprise JavaBean 2.0 Specification Changes, http://java.sun.com/jsp_utils/PrintPage.jsp?url=http%3A%2F%2Fjava.sun.com%2Fdevel..., Dec. 17, 2004, pp. 1-4.

Stearns, EJB 2.0 Container-Managed Persistence Example, http://java.sun.com/jsp_utils/PrintPage.jsp?url=http%3A%2F%2Fjava.sun.com%2Fdevelo..., Dec. 17, 2004, pp. 1-9.

Not Assigned, Hambrick et al. Method and Apparatus for Implementing Container Managed Batch Jobs In an Enterprise Java Bean Environment.

Not Assigned, Hambrick et al. System and Method to Implement Container Managed Streams in J2EE Environments.

* cited by examiner

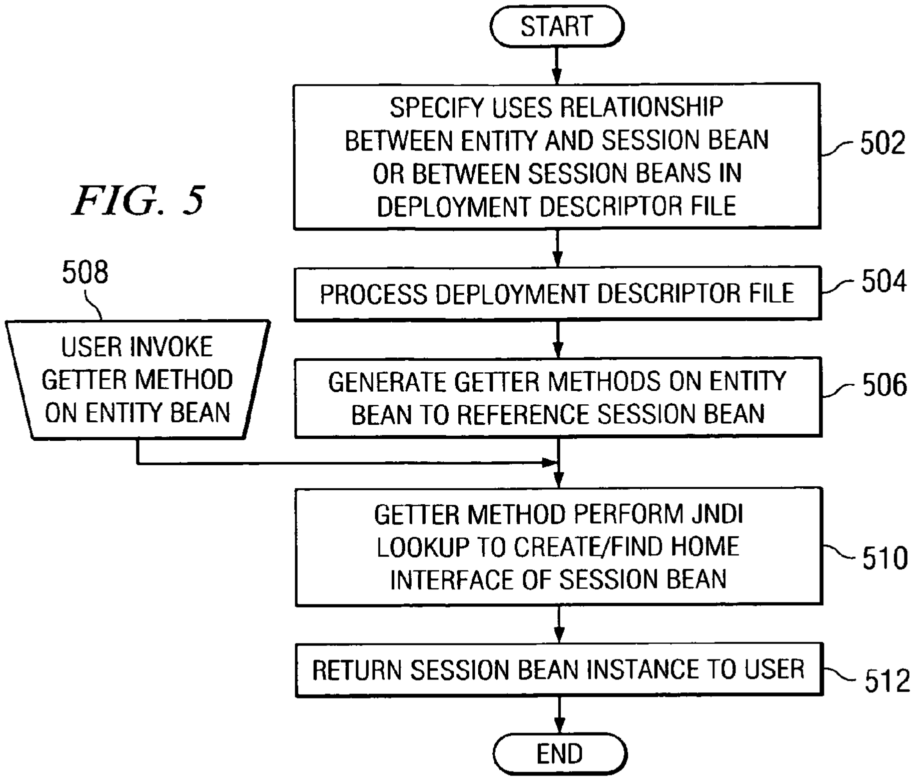
FIG. 5
FIG. 6
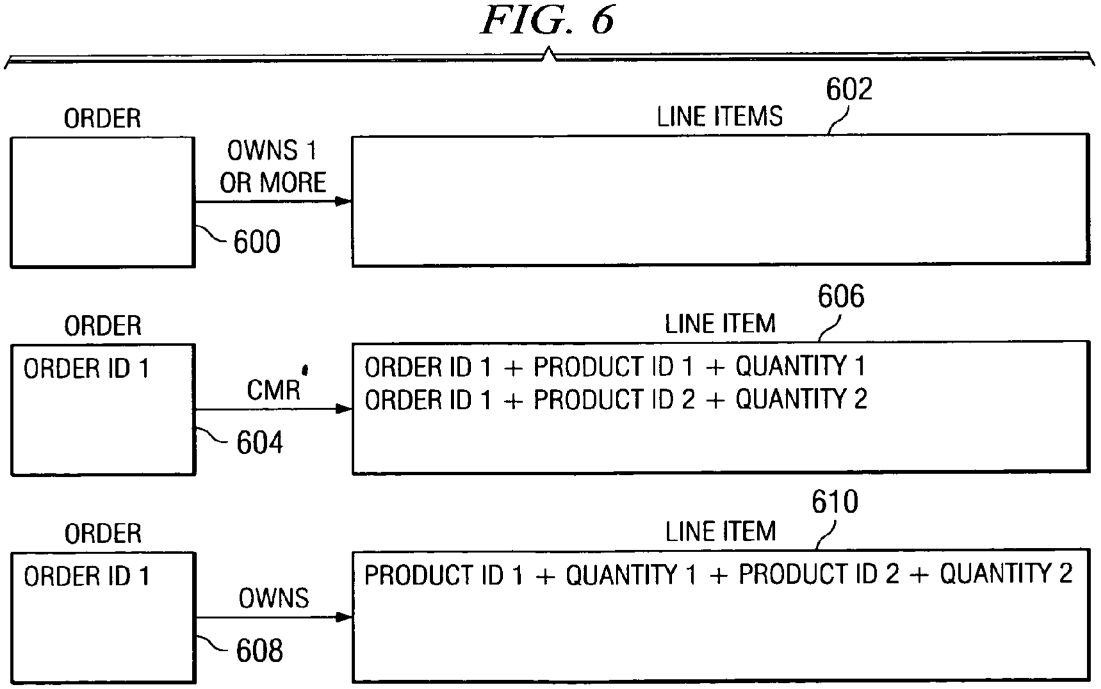

```
public abstract class PostingStep  1100
   implements com.ibm.websphere.batch.BatchJobStepInterface {

   public void createJobStep() {  1102
      setTotalPosting(0);
   }

   public void destroyJobStep() {  1104
      // null method

   }

   public int processJobStep() {  1106
      Posting p = getNextPosting();  1108
      if (p == null) {
         return BatchConstraints.STEP_COMPLETE;
      } else {
         try {
            if (p.tranKey == 0) {
               getAccountAccess().creditAccount(  1110
                  p.accountNumber,
                  new Double(p.amount));
            } else {
               getAccountAccess().debitAccount(  1112
                  p.accountNumber,
                  new Double(p.amount));
            }
         } catch (Overdraft e) {
            putNextOverdraft(e);  1113
         } catch (Exception e) {
            throw new JobFailed(e);
         }

         setTotalPosting(getTotalPosting() + p.amount);
         return BatchConstraints.STEP_CONTINUE;
      }
   }

   //CMB Section
   protected abstract double getTotalPosting();  1114
   public abstract void setTotalPosting(double value);  1116

   //CMS Input Section
   protected abstract Posting getNextPosting();  1118

   //CMS Output Section
   protected abstract void putNextOverdraft(Overdraft value);  1120

   //CMU Section
   protected abstract AccountAccess getAccountAccess();  1122
```

*FIG. 11*

```
public abstract class PostingStepEntityBean
    extends com.ibm.test.PostingStep                    1200
    implements javax.ejb.EntityBean {
    protected InitalContext ic = null;
    private static final String ACCOUNT_NAME =
        "java:comp/env/ejb/AccountAccess";
    //CMS Output Impl
    public static final String OVERDRAFTSTREAM_NAME = "OverdraftStream";
    // CMS Input Impl
    public static final String POSTINGSTREAM_NAME = "PostingStream";
    //CMU Impl
    private AccountAccess accountAccess = null;
    private javax.ejb.Entity Context myEntityCtx;
    private transient OverdraftStream overdraftStream = null;
    private transient PostingStream postingStream = null;
    public void setEntityContext(javax.ejb.EntityContext ctx) {
        myEntityCtx = ctx;
    }
    protected AccountAccess getAccountAccess() {    1202
        if (accountAccess == null) {
            AccountAccessHome accountAccessHome = null;
            try {
                accountAccessHome =
                    (AccountAccessHome) getIC().lookup(ACCOUNT_NAME);
                accountAccess = accountAccessHome.create();

            } catch (Exception e1) {
                throw new JobFailed(e1);
            }
        }
        return accountAccess;
    }
    protected Posting getNextPosting() {    1204
        if (postingStream == null) {
            BatchDataStreamConfig postingStreamConfig =
                BatchDataStreamConfig.getBatchDataStreamConfig(
                    POSTINGSTREAM_NAME,
                    getStepID());
            postingStream =
                (PostingStream) postingStreamConfig.getBatchDataStream();    1206
        }
        return postingStream.getNextRecord();    1207
    }
    protected double getTotalPosting() {
        // TODO Auto-generated method stub
        return 0;
    }
    protected void putNextOverdraft(Overdraft value) {    1208
        if (overdraftStream == null) {
            BatchDataStreamConfig overdraftStreamConfig =
                BatchDataStreamConfig.getBatchDataStreamConfig(
                    OVERDRAFTSTREAM_NAME,
                    getStepID());
            overdraftStream =
                (OverdraftStream) overdraftStreamConfig.getBatchDataStream();    1209
        }
        overdraftStream.putNextRecord(value);    1210
    }
}
```

*FIG. 12*

```
package com.ibm.gs.batch2;

import java.io.IOException;
import java.util.StringTokenizer;

/**
* Bean Implementation class for Enterprise Bean: PostingStream
*/
public class PostingStream extends InputFileDataStream { ~1300

    public PostingStream() {
    }

    public Posting getNextRecord(){ ~1302
        try {
            String input = getNextLine();
            if (Input I=null) {
                StringTokenizer stk = new StringTokenizer(input,",");
                int tKey = Integer.parseInt(stk.nextToken());
                String accountNumber = stk.nextToken();
                double amount = Double.parseDouble(stk.nextToken());
                return new Posting(tKey, accountNumber, amount);
            }
            else { ~1304
                close();
                return null;
            }
        } catch (Exception e) {
            close();
            throw new JobFailed(e);
        }
    }
}
```

*FIG. 13*

```
package com.ibm.test;

import com.ibm.test.Overdraft;

/**
* Bean Implementation class for Enterprise Bean: OverdraftStream
*/
public class OverdraftStream extends StderrDataStream { ~1400
    public OverdraftStream() {
    }
    public void putNextRecord(Overdraft od){ ~1402
        put(od);
    }
}

public abstract class StderrDataStream ~1404
    extends com.ibm.websphere.batch.DataStream {

    public StderrDataStream() {
    }
    public void put(Object obj) { ~1406
        System.err.println(obj.toString());
    }
    public void close() {
        // Since this DataStream is writing to stderr, there is no need to
        // close the stream. So this method is a null method.
    }
    public String externalizeCheckpointInformation() {
        // Since this DataStream is writing to stderr, there is no checkpoint
        // information. So a "None" is returned.

        return "None";
    }
    public void InternalizeCheckpointInformation(String chkptinfo) {
        // Since this DataStream is writing to stderr, there is no way of
        // restarting from a checkpoint, so this is a null method.
    }
    public void open() {
        // Since this DataStream is writing to stderr, there is nothing to open
        // so this is a null method
    }
    public void positionAtCurrentCheckpoint() {
        // There is no cursor to position, so this is a null method
    }
    public void positionAtInitialCheckpoint() {
        // There is no cursor to position, so this is a null method
    }
}
```

```
<?xml version="1.0" encoding="UTF-8"?> 1502
<job-name="TestJob" xmlns:xsi="http://www.w3.org/2001/XMLSchema-instance"
xsi:noNamespaceSchemaLocation="xJCL.xsd"> 1504
   <jndi-name>ejb/com/ibm/websphere/samples/PostingsJob</jndi-name>
   <job-scheduling-criteria> 1506
      <affinity bjee="JobSched1" bjee-pool="Pool1"/>
   </job-scheduling-criteria>
   <step-scheduling-criteria> 1508
      <scheduling-mode>sequential</scheduling-mode>
   </step-scheduling-criteria>
   <checkpoint-algorithm name="timebased"> 1510
      <classname>com.ibm.wsspl.batch.checkpointalgorithms.timebased</classname>
      <props>
         <prop name="interval" value="15"/>
      </props>
   </checkpoint-algoritm>
   <results-algorithms> 1512
      <results-algorithm name="jobsum">
         <classname>com.ibm.wsspi.batch.resultsalgorithms.jobsum</classname>
         <required>Y</required>
      </results-algorithm>
   </results-algorithms>
   <job-step name="Step1"> 1514
      <jndi-name>ejb/DataCreationBean</jndi-name>
      <checkpoint-algorithm-ref name="timebased"/>
      <results-ref name="jobsum"/>
      <batch-data-streams>
         <bds>
            <logical-name>myoutput</logical-name>
            <impl-class>com.ibm.websphere.samples.PostingOutputStream</impl-class>
            <props>
               <prop name="FILENAME" value="E:/Development/Batch/Prototype/zout1.out"/>
            </props>
         </bds>
      </batch-data-streams>
      <props>
         <prop name="wsbatch.count" value="5000"/>
      </props>
   </job-step>
   <job-step name="Step2"> 1516
      <step-scheduling condition="or"
         <resource-expression name="ReturnCode_Step1" operator="eq" value="0"/> 1518
```

TO FIG. 15B

FROM FIG. 15A

```
    </step-scheduling>
    <jndi-name>ejb/PostingAccountData</jndi-name>
    <checkpoint-algorithm-ref name="timebased" />
    <results-ref name="jobsum" />
    <batch-data-streams>          1520
      <bds>
        <logical-name>myinput</logical-name>
        <impl-class>com.ibm.websphere.samples.PostingStream</impl-class>
        <props>
          <prop name="FILENAME" value="E:/Development/Batch/Prototype/zout1.out" />
        </props>
      </bds>                      1522
      <bds>
        <logical-name>myoutput</logical-name>
        <impl-class>com.ibm.websphere.samples.OverdraftStream</impl-class>
        <props>
          <prop name="FILENAME" value="E:/Development/Batch/Prototype/zout1.overdraft.list"
/>
        </props>
      </bds>
    </batch-data-streams>
  </job-step>
</job>
```

METHOD AND APPARATUS FOR IMPLEMENTING CONTAINER MANAGED USES, OWNERSHIPS, AND REFERENCES IN AN ENTERPRISE JAVABEAN ENVIRONMENT

CROSS REFERENCE TO RELATED APPLICATIONS

The present invention is related to the following applications entitled METHOD AND APPARATUS FOR IMPLEMENTING CONTAINER MANAGED BATCH JOBS IN AN ENTERPRISE JAVA BEAN ENVIRONMENT, Ser. No. 11/030,778 filed on Jan. 7, 2005; SYSTEM AND METHOD TO IMPLEMENT CONTAINER MANAGED STREAMS IN J2EE ENVIRONMENTS, Ser. No. 11/031,420 filed on Jan. 7, 2005. All of the above related applications are assigned to the same assignee, and incorporated herein by reference.

BACKGROUND OF THE INVENTION

1. Technical Field

The present invention relates to an improved data processing system. In particular, the present invention relates to implementing enterprise JavaBeans™ development environment in a data processing system. Still more particularly, the present invention relates to implementing container managed uses, ownerships, reference only, batch processing, and sequential stream relationships in an enterprise JavaBeans™ development environment.

2. Description of Related Art

In most enterprise application development environments, developers often use enterprise JavaBeans™ objects for modeling interactions between components and for managing data persistence in their applications. J2EE Enterprise JavaBeans™ is a specification available from Sun Microsystems, Inc. Examples of enterprise JavaBeans™ (EJB) objects include 'Entity' beans and 'Session' beans. Entity beans model the persistent data used by the EJB application and application clients. An Entity bean is a type of enterprise JavaBeans™ that persists data in a data source beyond the lifetime of the client application. Session beans are designed to encapsulate the functions of a given task (or session) as requested by clients of the EJB interfaces. Often Session beans themselves are used to interact with the modeled Entity beans to perform some business logic.

Currently, relationships between entity beans in an enterprise application may be maintained by using container managed relationship (CMR) fields. Developers implement CMR fields by specifying the desired relationship between entity beans in the entity bean definition and adding the EJB relationships to a deployment descriptor file. When the enterprise application is deployed, the EJB container automatically enforces referential integrity of the relationships. Thus, when the code of an entity bean is updated, the container automatically updates the related entity bean. In this way, business methods may use CMR accessor methods to manipulate container managed relationships.

While relationships between entity beans are maintained, there is no existing mechanism that represents 'uses' relationship between an entity bean and a session bean. Thus, if an entity bean uses a session bean that encapsulates a related but reusable task, developers have to manually perform a lookup of a session bean home interface using Java Native Directory Interface (JNDI) passing a name made available to the entity bean code and then create an instance of the session bean. The container does not manage the relationship or generate relevant code. This manual operation of session bean lookup can be error prone, time-consuming, and inconsistent with the manner in which other container managed relationships are handled. Therefore, it would be advantageous to have an improved method for the container to maintain a 'uses' relationship between enterprise JavaBeans™, particularly between entity and session beans, such that implementation of JavaBeans™ may be more simple and more consistent.

In addition to uses relationship, there is also no existing mechanism that represents an 'owns' relationship between entity beans. Ownership is a particular type of directional relationship that indicates all access to the target entity of the relationship is implied to pass through the source entity. Thus, the "key" of the target always includes the key of the source. For example, if an order entity bean with an order number as the key "owns" a number of line items, the implicit key of an order line item is the order number plus any other properties of line items that ensure uniqueness, such as the product key or a sequence number.

Currently, an entity definition must explicitly specify the key fields of the owner entity as well the others specific to the target owned entity that insure uniqueness in any context. The disadvantage of this approach is that the owned entity is only usable in the limited context of the ownership relationship that exists at the moment. But that relationship may change. For example, if the developer subsequently decides that an order entity is owned by a customer entity, then the order entity needs to be changed to include the customer key fields as part of its essential state. Because the ownership relationship propagates to all other entities owned by order, the line item entity needs to be modified to include the customer key fields as part of its essential state as well.

Therefore, it would be advantageous to allow a developer to specify only the "key" properties of an entity and assume that when a container managed "ownership" or "owns" relationship is specified between two entities, that the key of the "owner" is propagated to the "owned" entity for purposes of deployment to the underlying database technology. Such an approach will enable an entity definition to be reused in many contexts without changes to the basic "type" definition.

For example, the same line item entity could be used in orders whether owned by customers or not. Further, an entity like an Address could be owned by multiple types of entities simultaneously and even more than once by the same one (such as a shipping and billing address for a customer). Such a mechanism enables all persistent objects to be declared as entity EJBs, with the understanding that the "owns" relationship will make the distinction between deployment options.

With CMR fields, if a relationship is established between entity beans, a method is generated to reference an entity bean from another entity bean. In cases of a one-to-many relationship, the entity bean on one side retrieves a list of related entity beans using the method. Currently, in order to extract primary key values from the list of entity beans returned, developers have to manually write additional code to extract the values. This manual process is costly, since the non-key essential state of the entity (the CMP fields) is typically needed to instantiate the EJB in memory. Furthermore, a getPrimaryKey method has to be invoked on the objects. In addition, this manual process is redundant because the container already has access to the key values when the list is built. Therefore, it would also be advantageous to have an improved method that enables automatically generating a method that performs the manual process to return a list of simple primary key values instead of the list of entity EJBs.

Furthermore, in current J2EE application servers, there is no existing mechanism that supports efficient batch computations. Batch computations are operations that execute highly repetitive tasks according to a preconfigured schedule. For example, a "transfer funds" batch process in a banking application may be needed to repeatedly transfer funds from one account to another as specified by an input file or database that contains the from and to account numbers, along with the amount to transfer. Other examples of batch computations include cases where the account has insufficient funds, a request is then written to an "overdraft" output file, where a final summary record is logged describing the number of funds transferred and total amount of funds transferred successfully as well as the number and total amount of overdrafts.

Typically, an enterprise batch job is scheduled manually by a user using non J2EE solutions. However, the non J2EE solutions do not allow reuse of online J2EE application logic, such as transferring funds from one account to another. Thus, a user has to re-implement the online application logic every time a batch job is run by the non J2EE solutions.

Further, enabling many of the expected qualities of service, such as the ability to checkpoint and restart, requires manual coding to persist the "essential state" of the batch job. Making the checkpoint interval configurable also requires manual coding. In case of a fund transfer batch process, the essential states include the position in the transfer request file, the current sum of funds transferred successfully, and the total number of accounts involved. Requiring manual coding of this restart logic is likewise tedious and error prone.

Therefore, it would be advantageous to have an improved method to support batch computations in J2EE application servers, such that batch applications may be built, deployed, and run in a J2EE environment enabling reuse of application logic.

In addition, even though CMR fields allow establishing multi-cardinality relationships between two entities, the assumption is that a list is returned including all the related entities. There is no existing mechanism for specifying that the multi-cardinality relationship is primarily "one at a time" for the purpose of either reading or writing. This relationship is known as a "streaming" relationship. A fund transfer batch job is one example where a streaming relationship between two entities is especially important. The fund transfer batch job may require reading one fund transfer request at a time or writing one overdraft record at a time.

Typically, because the batch data is associated with file data streams, the code for reading records is manually coded in a non-standard way that prevents the container from managing the efficiency or establishing relationships with other EJBs. Even if such a streaming relationship is coded with standard entity EJBs, the developer must manually code and use a special kind of finder method that returns a single entity when given a current position, possibly among others, for propagation of keys.

Therefore, it would be advantageous to have an improved method that recognizes a relationship between entity beans as an input or output data streaming relationship, such that relevant code may be automatically generated to manage the relationship. In addition, it would be advantageous to have an improved method that automatically generates a method for input stream relationships that returns the last record in the data stream, such that no explicit lookup is necessary in the source code; and a method for output stream relationships that appends a record to the end of the stream.

Furthermore, for batch processing in a J2EE environment, there is no existing mechanism that provides a generic definition for batch processing, including job steps and other configuration information for a batch job. Currently, developers have to customize each batch job step separately, which requires significant development effort. Therefore, it would be advantageous to have a definition language integrated with the EJB container that allows developers to specify batch processing information.

SUMMARY OF THE INVENTION

The present invention provides a method, an apparatus, and computer instructions implementing container managed uses, owns, and reference relationships in an enterprise JavaBeans environment. The mechanism of the present invention detects at least one definition of a relationship between a plurality of entity and session beans in a deployment descriptor file, wherein the relationship includes one of a use, ownership, and reference relationship.

For use relationships, responsive to processing the deployment descriptor file, the mechanism of the present invention generates a method on at least one entity bean in the plurality of entity beans to reference at least one session bean in the plurality of session beans. Responsive to a user invoking the method, the mechanism of the present invention performs a lookup of a home interface of the session bean and returns a session bean instance to the user.

For owns relationships, responsive to processing the deployment descriptor file, the mechanism of the present invention propagates a first key of the at least one owning entity bean in the plurality of entity beans to at least one owned entity bean in the plurality of entity beans. Responsive to a user updating the first key of the at least one owning entity bean, the mechanism of the present invention updates a second key of the at least one owned entity bean.

For reference relationships, responsive to processing the deployment descriptor file, the mechanism of the present invention generates a method on at least one referencing entity bean in the plurality of entity beans, wherein the method retrieves one of a key of the plurality of entity beans for a single referenced entity bean and a list of keys of the plurality of entity beans for the plurality of multiple referenced entity beans. Responsive to a user invoking the method, the mechanism of the present invention returns one of the key of the plurality of entity beans for the single reference entity bean and the list of keys of the plurality of entity beans for the plurality of multiple referenced entity beans to the user.

In addition, the present invention provides a markup language definition for defining information for a batch job, which includes a plurality of batch beans to be invoked, wherein each batch bean of the plurality is scheduled to be invoked by a job scheduler for the batch job; a plurality of job steps to be taken by each batch bean; and one or more resources to perform the batch job.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 5 is a flowchart of an exemplary process for implementing container managed uses relationship in an enterprise JavaBeans environment in accordance with a preferred embodiment of the present embodiment;

FIG. 6 is an example implementation of container managed own relationships in an enterprise JavaBean environment in accordance with a preferred embodiment of the present embodiment;

FIG. 11 is a diagram illustrating a posting step abstract class in accordance with a preferred embodiment of the present embodiment;

FIG. 12 is a diagram illustrating a posting step entity bean abstract class in accordance with a preferred embodiment of the present embodiment;

FIG. 13 is a diagram illustrating a posting stream class in accordance with a preferred embodiment of the present embodiment;

FIG. 14 is a diagram illustrating a overdraft stream class and a StderrDataStream class in accordance with a preferred embodiment of the present embodiment;

FIG. 15A is a diagram illustrating an exemplary XJCL definition in accordance with a preferred embodiment of the present embodiment; and FIG. 15B is a diagram illustrating an exemplary XJCL definition in continuation of FIG. 15A in accordance with a preferred embodiment of the present embodiment.

DETAILED DESCRIPTION OF THE PREFERRED EMBODIMENT

Figure 1:
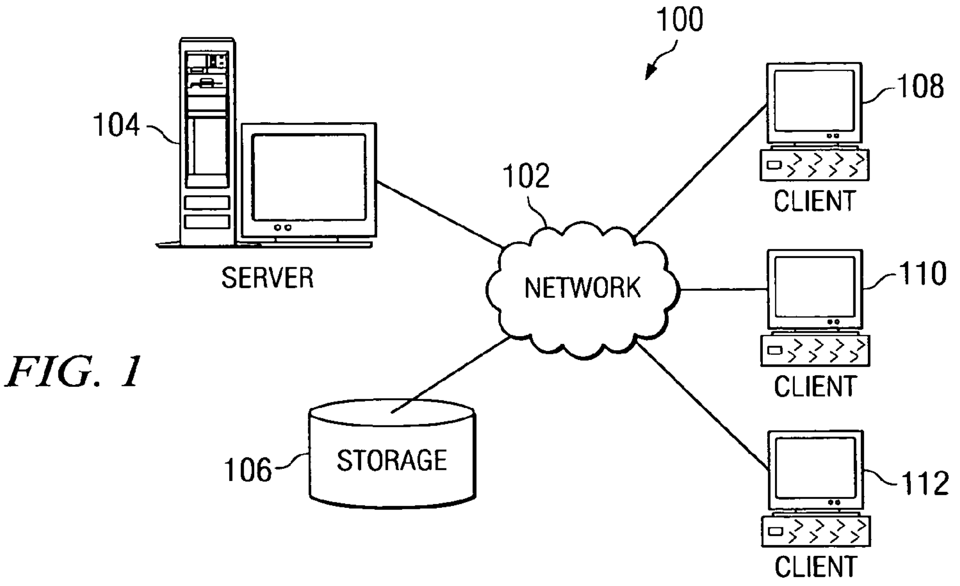
FIG. 1 depicts a pictorial representation of a network of data processing systems in which the present embodiment may be implemented.

With reference now to the figures, FIG. 1 depicts a pictorial representation of a network of data processing systems in which the present embodiment may be implemented. Network data processing system 100 is a network of computers in which the present embodiment may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational, and other computer systems that route data and messages of course, network data processing system 100 also may be implemented as a number of different types of networks, such as for example, an intranet, a local area network (LAN), or a wide area network (WAN). FIG. 1 is intended as an example, and not as an architectural limitation for the present embodiment.

Figure 2:
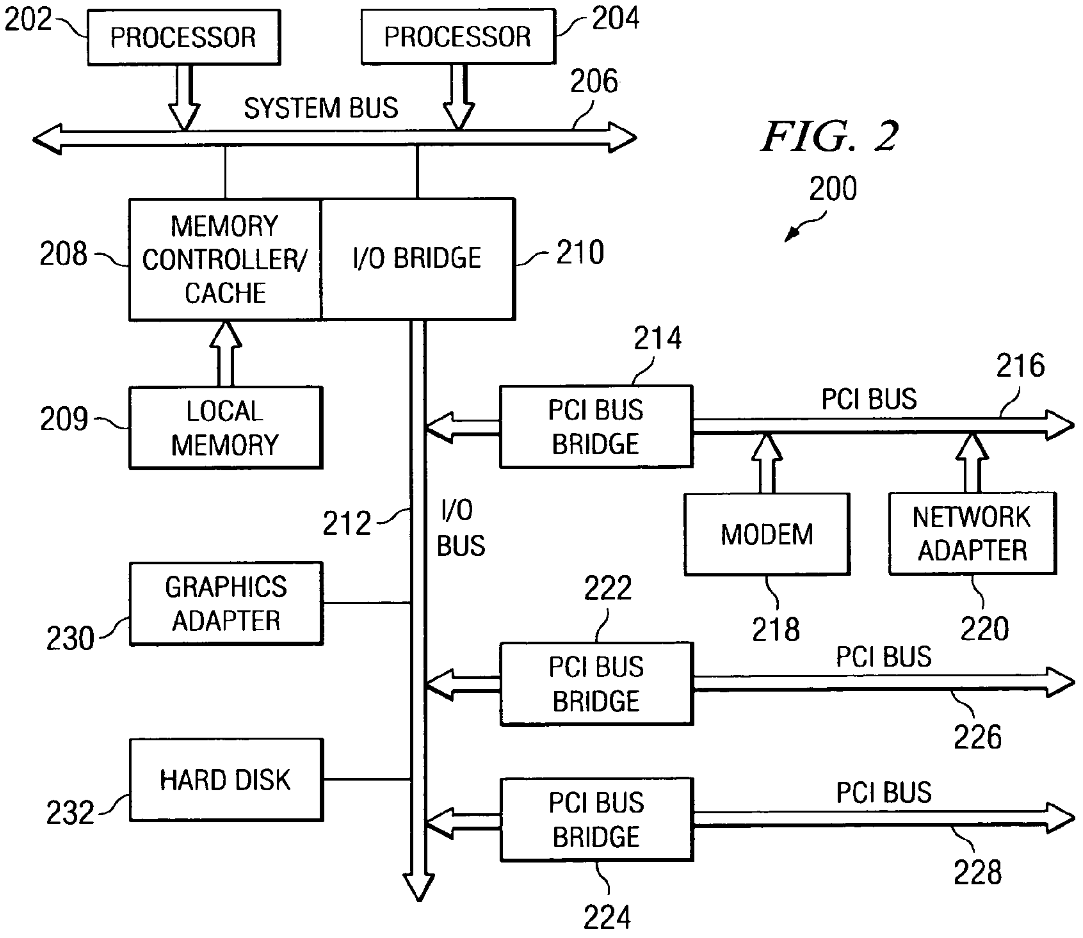
FIG. 2 is a block diagram of a data processing system that may be implemented as a server in accordance with a preferred embodiment of the present embodiment.

Referring to FIG. 2, a block diagram of a data processing system that may be implemented as a server, such as server 104 in FIG. 1, is depicted in accordance with a preferred embodiment of the present embodiment. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in connectors.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present embodiment.

The data processing system depicted in FIG. 2 may be, for example, an IBM eServer pSeries system, a product of International Business Machines Corporation in Armonk, N.Y., running the Advanced Interactive Executive (AIX) operating system or LINUX operating system.

Figure 3:
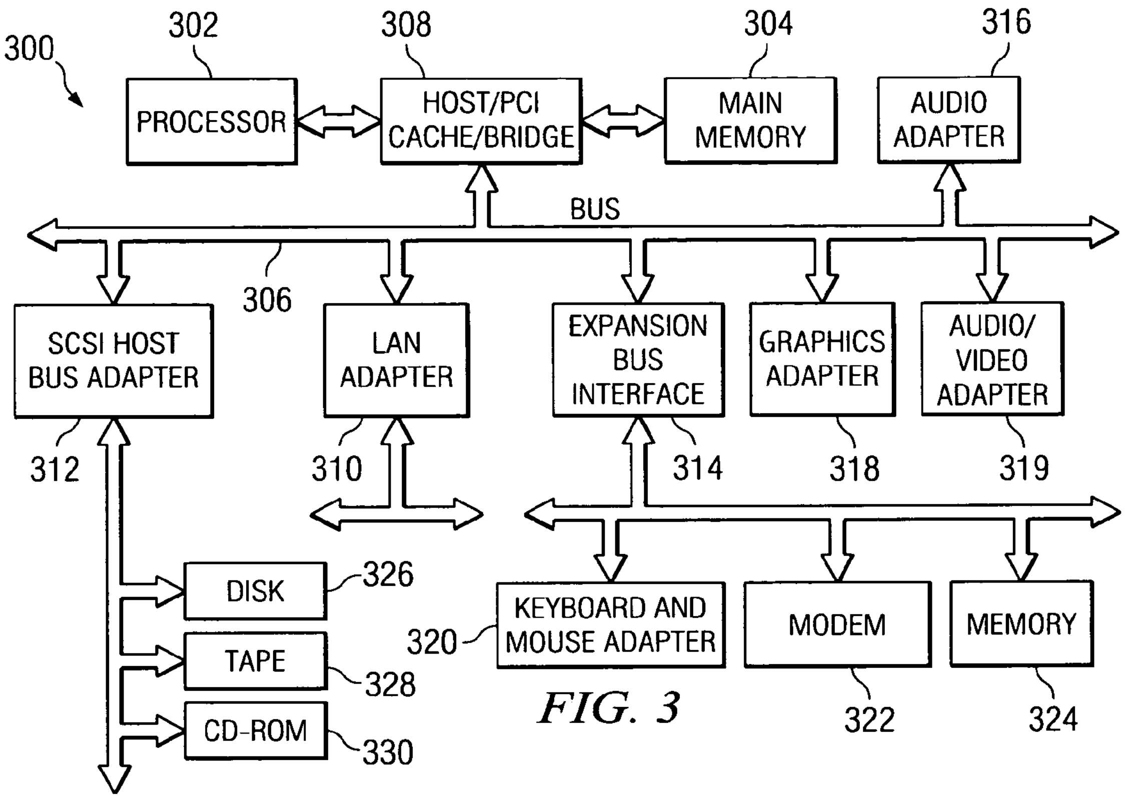
FIG. 3 is a block diagram illustrating a data processing system in which the present embodiment may be implemented.

With reference now to FIG. 3, a block diagram illustrating a data processing system is depicted in which the present embodiment may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows XP, which is available from Microsoft Corporation. An object-oriented programming system such as Java may run in conjunction with the operating system and provide calls to the operating system from Java programs or applications executing on data processing system 300. "Java" is a trademark of Sun Microsystems, Inc. Instructions for the operating system, the object-oriented programming system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. Also, the processes of the present embodiment may be applied to a multiprocessor data processing system.

As another example, data processing system 300 may be a stand-alone system configured to be bootable without relying on some type of network communication interfaces. As a further example, data processing system 300 may be a personal digital assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

The present embodiment provides an improved method, apparatus, and computer instructions for implementing container managed uses relationships between enterprise JavaBeans™ in a J2EE development environment. The present embodiment may be implemented in an application server, such as data processing system 200 in FIG. 2. The present embodiment extends the CMR methodology to include uses relationship between entity beans and session beans. The present embodiment may automatically generate methods to reference session bean EJB without the need of a lookup by developers for a session bean home interface.

With the present embodiment, a user may specify a 'uses' relationship between source enterprise JavaBeans™ and target enterprise JavaBeans™ in a container managed uses (CMU) section of the deployment descriptor file. The source and target EJBs may be defined using a key, such as the namespace and the home interface name of the bean. When the deployment description file is processed to generate EJBs, the container recognizes which EJB uses which EJB based on the relationship specified in the CMU section of the deployment descriptor file. In turn, a getter method on the session bean is generated and associated with the entity bean. The getter method performs a manual operation to obtain a reference to the session bean through a home interface. The method finds a home interface by performing a JNDI lookup of the session bean and creates a reference to the session bean instance.

For example, a user may specify in the CMU section of the deployment descriptor file that a customer source entity bean uses a credit card target session bean. When the deployment descriptor file is processed, a getCreditCard( ) method is generated by the present embodiment and associated with the customer entity bean. The getCreditCard( ) method performs a manual lookup of the credit card session bean using JNDI based on a key, such as the home interface name and namespace of the credit card session bean, and provides a reference to the credit card target session bean instance.

Thus, with the present embodiment, container managed uses relationships may be maintained between entity beans and session beans. A service locator pattern may be used by entities that are extended to session beans. A user may specify relationships in the deployment descriptor file along with CMR fields. In this way, manual lookup of session bean home interface by developers are eliminated and replaced with a getter method that is automatically generated to perform the session bean lookup based on the specified relationship in the deployment descriptor file.

In addition, by maintaining CMU relationships between EJBs, not only local relationships are maintained, remote EJB relationships are also maintained with handling of remote exceptions. The present embodiment includes an attribute in the CMU descriptor for a remote target session that indicates whether standard remote exceptions are to be passed through to the client or the source entity EJB.

Figure 4:
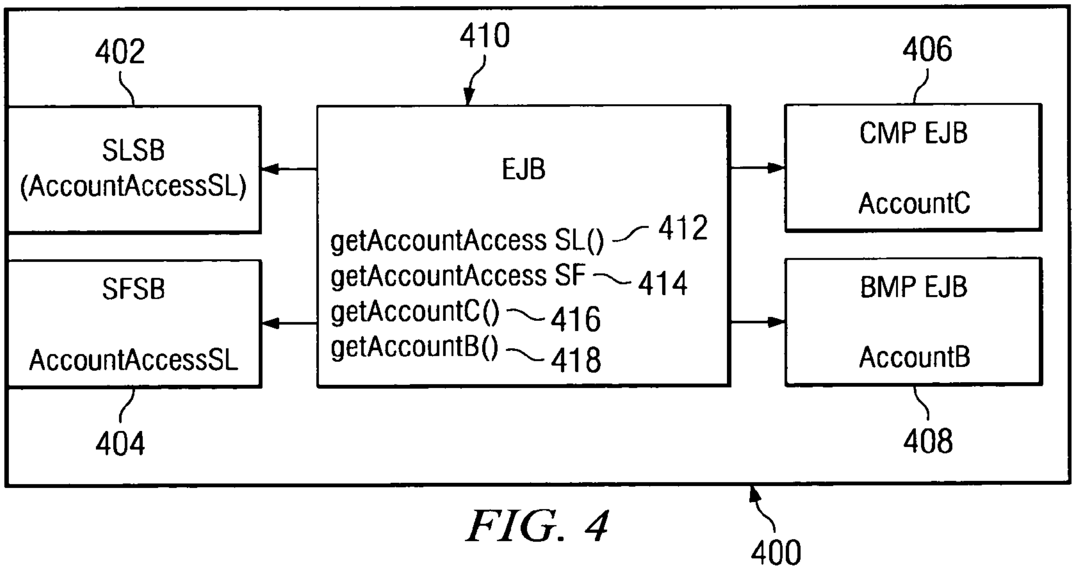
FIG. 4 is a diagram illustrating a number of uses relationships between entity beans and session beans in accordance with a preferred embodiment of the present embodiment.

Turning now to FIG. 4, a diagram illustrating a diagram of 'uses' relationships between entity beans and session beans is depicted in accordance with a preferred embodiment of the present embodiment. As shown in FIG. 4, application 400 includes four types of session beans: stateless session bean (SLSB) 402, stateful session bean (SFSB) 404, container-managed persistent (CMP) EJB 406, and bean-managed persistent (BMP) EJB 408.

Source EJB 410 may be a subtype of an entity EJB or session EJB. The mechanism of the present embodiment generates a getter method and associates it with source EJB 410 for each session bean it uses. In this example, getAccountAccessSL method 412 provides a reference to SLSB 402, getAccountAccessSF method 414 provides a reference to SFSB 404, getAccountC method 416 provides a reference to CMP EJB 406, and getAccountB method 418 provides a reference to BMP EJB 408. However, it is noted that the names of the methods need not include the types and do not need to be explicitly known to the client code in the source EJB.

Turning now to FIG. 5, a flowchart of an exemplary process for implementing container managed uses relationship in an enterprise JavaBeans™ environment is depicted in accordance with a preferred embodiment of the present embodiment. As shown in FIG. 5, the process begins when a user specifies 'uses' relationship between entity beans and session beans in a deployment descriptor file (step 502).

Next, the mechanism of the present embodiment processes the deployment descriptor file (step 504) and generates a getter method on the entity bean that provides a reference to the session bean (step 506). Later, when the user invokes the getter method on the entity bean for the session bean (step 508), the getter method performs a JNDI lookup to either create or find a home interface of the session bean (step 510). Then, the mechanism of the present embodiment returns the created or found session bean instance to the user (step 512) and the process terminates thereafter.

In addition to 'uses' relationships, the present embodiment also extends the CMR methodology to include 'owns' relationship between entity beans, such that the key fields of the owner in the relationship may be propagated to the owned entity transparently. Currently, developers use CMP fields to specify keys and CMR fields to specify relationships between EJBs. However, CMR fields only provide general relationships between two EJBs and are not intended for use in keys. In particular, there is no way for a user to specify a key on one EJB as being part of the key for another EJB. Nor is there a way to specify a directional relationship like ownership that indicates propagation of key fields.

For example, the current system may maintain a relationship between an order bean and a line item bean using CMR fields. The key of a particular line item of an order may be specified using an order id in combination with a product id. The order id is part of the order bean. Thus, part of the key of the particular line item is related to the owner of line item bean, the order bean. There is currently no way to specify both in the context of a single directional relationship.

With the present embodiment, a user may specify a 'owns' relationship between the order bean and the line item in a container managed 'own' section of the deployment descriptor file. When the mechanism of the present embodiment processes the deployment descriptor file, the container recognizes which EJB owns which EJB.

In addition, the container recognizes that the key field of the owner bean propagates transparently and automatically to the owned bean, providing both key fields and the benefit of a CMR through a <OwnerType> get<OwnerType>( ) method. In the above example, the mechanism of the present embodiment propagates the order id of the order bean to the key of the line item. If an update is made to the specification of key fields of the order, then upon re-deployment, the mechanism of the present embodiment modifies the line item deployment to reflect the new fields that now make up part of its key. Further, if the order is subsequently deployed as being "owned" by another entity, like a customer entity, the mechanism of the present embodiment propagates the key fields of the customer to order and to line item where CMR methods can be automatically generated to getcustomer( ) and getorder( ).

One advantage of the present embodiment is that the data associated with instances owned by another can be stored in the same table as the owning entity. In this case, the key fields of the owning entity need only be stored once per record regardless of the number of owned entities stored in the same record, reducing the amount of data that need be stored and retrieved. The other CMP fields of the owned entities can be mapped to columns that encode both the role and CMP field name. For example, suppose a user uses an ORDER table record to store an order entity and its billing and shipping addresses related through CMO. In this case, the ORDERID field only need be stored in the record once. The CMP fields of the shipping and billing addresses, like the street, city, state and postal code, can be stored in columns with names like SHIPPINGSTREET, BILLINGSTREET, SHIPPINGCITY, BILLINGCITY and so on.

Another advantage of the present embodiment is if each entity type is stored in its own table regardless of role or owner, then the mechanism of the present embodiment may map the key fields of the owner and the role name to columns transparently and automatically to uniquely identify an instance. The mechanism of the present embodiment may map the CMP fields of the type to columns without regard to their role in any owning entity. For example, if all order shipping and billing addresses entities are stored in an ADDRESS table separate from the ORDER table, then the serialized key of the order is stored in a general OWNER column. The ROLE column for a given role would store values like "ORDERSHIPPING" or "ORDERBILLING". Both OWNER and ROLE would uniquely identify the instance. The CMP fields for an address type would be mapped to their own columns, like STREET, CITY, STATE and POSTALCODE.

Still another advantage of the present embodiment is if each entity associated with a given owner is stored in its own table, then the key fields of the owner type can be automatically and transparently mapped by the mechanism of the present embodiment to their own columns to enable indexing and queries on the owner key fields. The role of the instance, if the same type plays more than one role with respect to the owning entity, is indicated through a ROLE column as described above. And also similar to when entity types are mapped to their own table, the CMP fields can be mapped by the mechanism of the present embodiment to columns without regard to their role in any owning entity. For example, if a user uses an ORDERADDRESS table to store addresses owned by orders, then a column for ORDERID would maintain the key of the owning order, the ROLE column would indicate whether the address is a shipping or billing address through a string or encoded value, and the CMP fields for address would be maintained in columns like STREET, CITY, STATE and POSTALCODE as above.

And still yet another advantage of the present embodiment is if a user stores each ownership relationship in its own table, then the mechanism of the present embodiment maps the key fields of the owner type automatically and transparently to their own columns to enable indexing and queries on the owner key fields. The role of the instance, if the same type plays more than one role with respect to the owning entity, is indicated through the table name and need not be stored at all. As mentioned above, the mechanism of the present embodiment maps the CMP fields to columns without regard to their role in any owning entity. For example, if a user uses ORDERBILLINGADDRESS table to store billing addresses owned by orders, then a column for ORDERID would maintain the key of the owning order, and the CMP fields for address would be maintained in columns like STREET, CITY, STATE and POSTALCODE as above.

It is entirely possible to persistently store the data associated with CMO in files and other non-relational table mechanisms following a similar mapping approach to those described above.

In addition to enabling multiple approaches to reducing redundancy of data, CMO also makes modifying the relationships between entities more efficient. For example, an order may be initially considered "unowned", and has no owner key to propagate into the tables or other persistence mechanisms. Later, if a customer owns an order and the order owns line items and shipping and billing addresses, the present embodiment makes it possible to transparently and automatically propagate the new ownership relationship into the underlying persistence mechanism when the mechanism of the present embodiment re-deploys the entities after the changes.

Furthermore, the present embodiment of CMO enhances reuse of EJBs as types. For example, a customer may include information such as a preferred home address, billing address, and shipping address. A developer may reuse the address EJB type simply by specifying new CMO relationships between customer and address EJBs for the home, billing and shipping roles Subsequently, a new entity EJB, such as shipper may be developed to fulfill a given application function. It can reuse the address type again by declaring a CMO. The reuses of the address EJB can exploit any of the approaches outlined above to persistently store the data.

Turning now to FIG. 6, an example implementation of container managed 'own' relationships in an enterprise JavaBeans™ environment is depicted in accordance with a preferred embodiment of the present embodiment. As shown in FIG. 6, order 600 owns one or more line items 602.

With current CMR methodology, a relationship may be specified between order 600 and line items 602. In this illustrative example implementation, a user may store order and line items data in two separate tables of a database, order table 604 and line item table 606. Order table 604 includes a list of order ids, for example, order id 1. Line item table 606 includes a list of line items for an order. In this example, order id 1 has a first line item identified by a product id 1 and a quantity 1. Order id also has a second line item identified by a product id 2 and a quantity 2.

With CMR fields, a relationship is maintained between order id 1 and the two line items using the order id field in line item table 606. Thus, the order id field is duplicated in the database. The mechanism of the present embodiment eliminates the duplicated order ids. Similar to order table 604, order table 608 also has a list of order ids, such as order id 1. However, unlike Line item table 606, line item table 610 uses a single record for the two line items of order id 1. The record includes a product id 1, quantity 1, product id 2, and quantity 2. Since a 'owns' relationship is maintained between the order instance and line item instances, there is no need for an order id field in line item table 610. Therefore, the mechanism of the present embodiment eliminates redundant data from the database.

Figure 7:
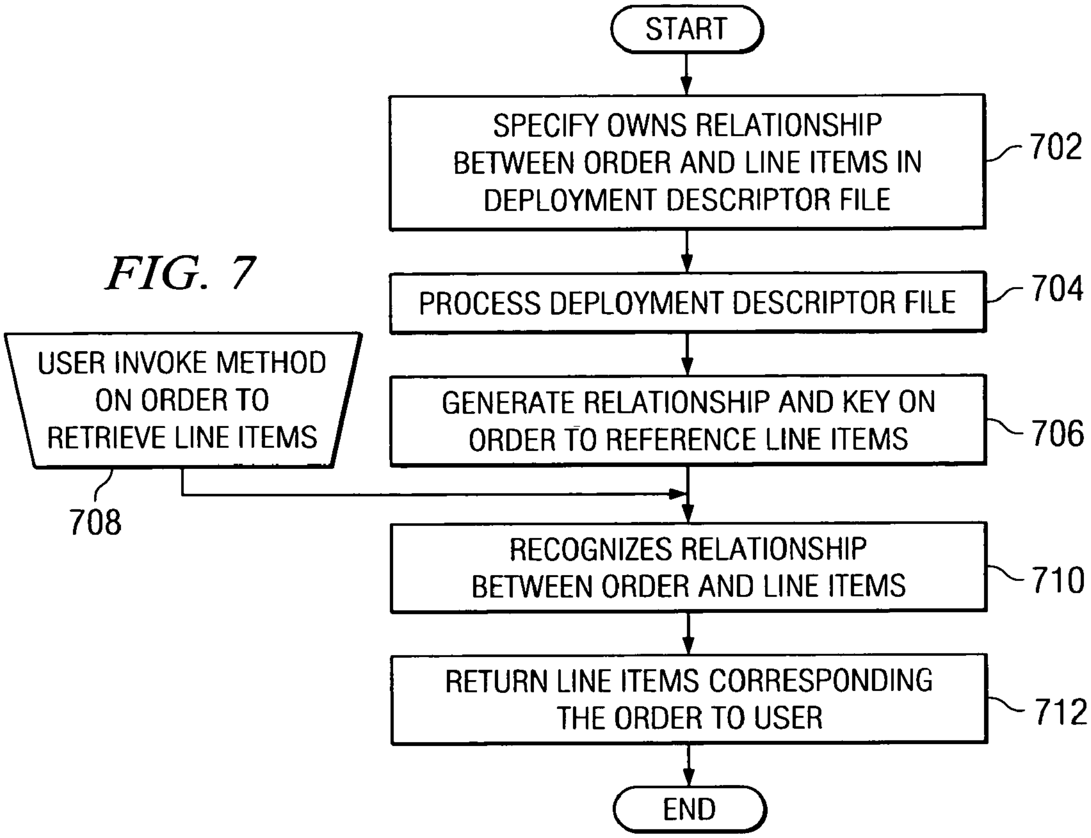
FIG. 7 is a flowchart of an exemplary process for implementing 'owns' relationship between orders and line items in a enterprise JavaBeans environment in accordance with a preferred embodiment of the present embodiment.

Turning now to FIG. 7, a flowchart of an exemplary process for implementing 'owns' relationship between orders and line items in a enterprise JavaBeans™ environment is depicted in accordance with a preferred embodiment of the present embodiment. As shown in FIG. 7, in this example implementation, the process begins when a user specifies a 'owns' relationship between an order and its line items in a CMO section of the deployment descriptor file (step 702).

Next, the mechanism of the present embodiment processes the deployment descriptor file (step 704) and generates relationships and keys to the line items and associated them with the order to reference corresponding line items (step 706). When the user later invokes a method on the order to retrieve its line items (step 708), the container recognizes the relationship between the order and its line items (step 710). In turn, the mechanism of the present embodiment returns corresponding line items to the user using the relationships and keys generated (step 712) and the process terminates thereafter.

The present embodiment also provides a lightweight "reference only" relationship between entity beans by extending the CMR methodology to specify a CM Ref relationship for an entity bean, such that only a single primary key or a list of primary keys for the multi-cardinality relationship is returned as an alternative to a list of EJB objects. With CMR fields, when a user specifies a relationship between entity beans, the current system returns only a single or list of EJB objects. In turn, developers have to manually invoke a getPrimaryKey method on each object in the list to determine the primary key value of each object.

With the present embodiment, a user may specify a CMRef relationship between two entity beans in the deployment descriptor file. When the mechanism of the present embodiment processes the deployment descriptor file, the mechanism of the present embodiment generates a get<Role> method that returns a key or list of keys of the related EJB type with the number of keys depending on the cardinality of the CMRef. This get<Role> method is more efficient than the alternative that returns one or more EJBs, since only the key fields need to be retrieved, and no EJB need be instantiated and cached.

For example, a customer entity bean may be related to a list of account entity beans. By declaring a CMR field with a role name of accounts, a getAccounts method is specified. When a user invokes the getAccounts method on or within the customer object, the current system returns a list of account EJB objects. In turn, developers iterate the list of accounts and retrieve each corresponding primary key. This operation is expensive because it requires significant development efforts.

With the present embodiment, a user may specify CMRef relationship with a role of accountIDs in the deployment descriptor file between the customer and the account entity beans. When the mechanism of the present embodiment processes the deployment descriptor file, in addition or alternative to the getAccounts method as discussed above, the mechanism of the present embodiment generates a getAccountIds method to return a list of account ids. In this way, no EJBs are maintained in memory while the primary key values are still accessible to the user.

In another example, a user may specify a CMR relationship between an order and line items with a role name of lineItems. A generated getLineItems method in the order entity bean generally returns a list of line item EJBs. In turn, developers iterate through the list and invoke a getPrimaryKey method on each of the line items to retrieve the primary key value. With CMRef, suppose that a user specifies a CMRef relationship between the order and line items with a role named lineItemKeys. In this case, a getLineItemKeys method in the order entity bean is generated to return only a list of line item keys, not a list of line items.

Thus, the mechanism of the present embodiment provides a lightweight solution to the users who only want to access the primary keys of other entity beans.

Figure 8:
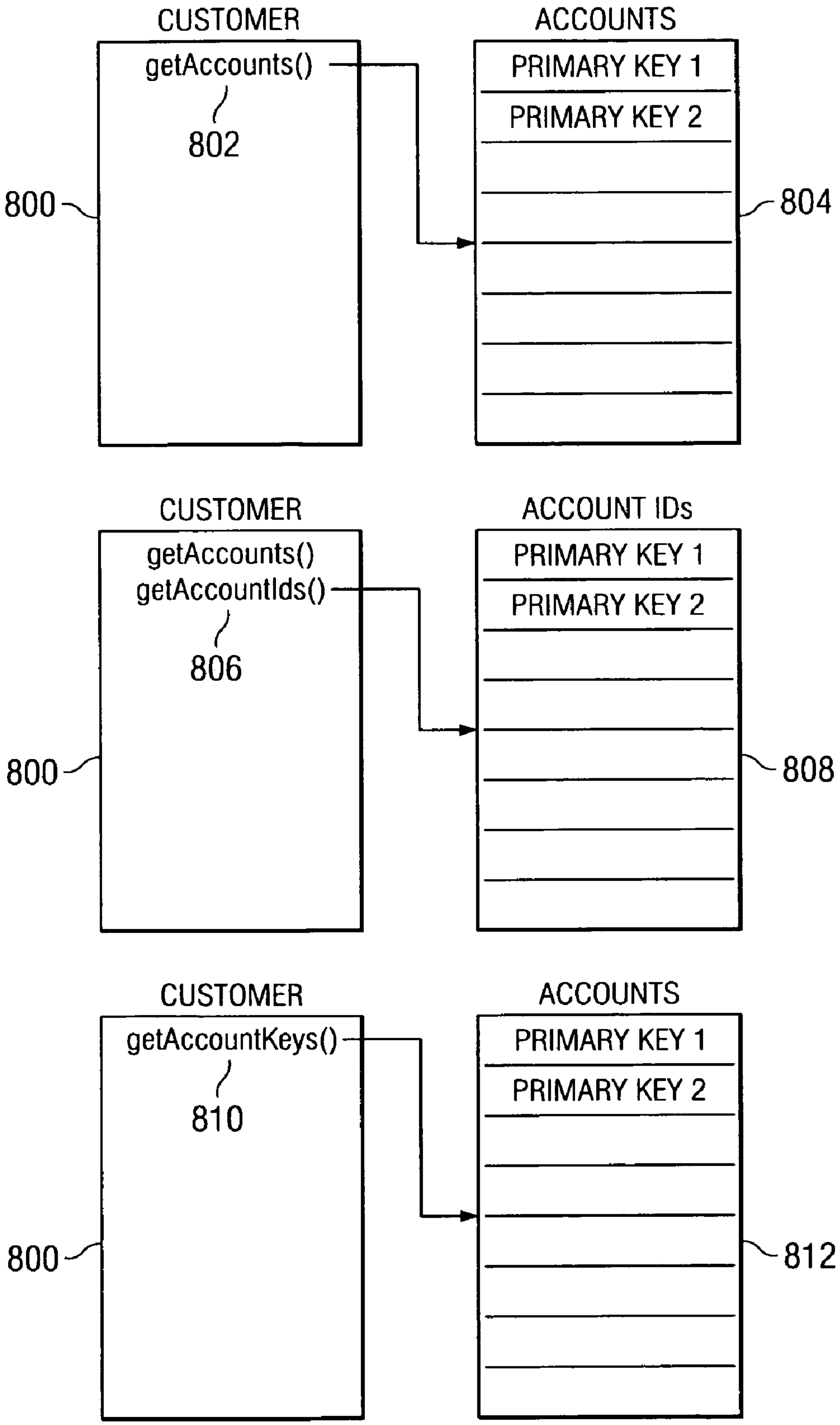
FIG. 8 is a diagram of an example implementation of container managed reference in an enterprise JavaBeans environment in accordance with a preferred embodiment of the present embodiment.

Turning now to FIG. 8, a diagram of an example implementation of container managed reference in an enterprise JavaBeans™ environment is depicted in accordance with a preferred embodiment of the present embodiment. As shown in FIG. 8, customer bean 800 includes a getAccounts method 802, which returns a list of account objects 804 to customer 800.

With the CMR fields, after the current system returns a list of accounts 804, developers have to manually invoke a getPrimaryKey method on each account object in order to retrieve a primary key for each account. However, with CMRef of the present embodiment, along with a getAccounts method, the mechanism of the present embodiment generates a getAccountIds method 806 upon processing the Ref relationships in the deployment description file. The getAccountIds method returns a list of primary keys instead of a list of account objects.

In addition, customer bean 801 shows a customer bean that only specifies a CMRef relationship between customer and accounts. Therefore, customer bean 801 only includes a getAccountKeys method 810, which returns a list of keys for each account object 812. In this way, a 'lite' relationship between the customer bean and the account bean is represented by the keys returned by the mechanism of the present embodiment using the getAccountKeys method 810. This difference shows that the name of the CMRef method is specifiable by the developer.

Figure 9:
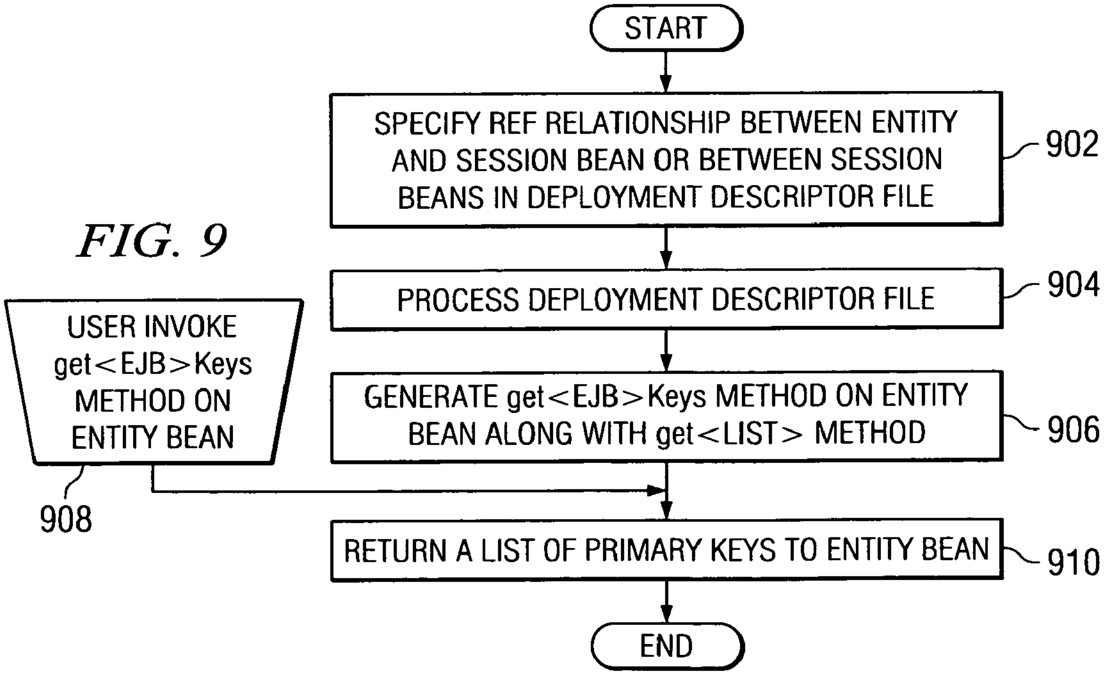
FIG. 9 is a flowchart of an exemplary process for implementing container managed ref relationship in an enterprise JavaBeans environment in accordance with a preferred embodiment of the present embodiment.

Turning now to FIG. 9, a flowchart of an exemplary process for implementing container managed ref relationship in an enterprise JavaBeans™ environment is depicted in accordance with an embodiment of the present embodiment. As shown in FIG. 9, the process begins when a user specifies ref relationship between entity bean and session beans or between session beans in a deployment descriptor file (step 902). Next, the mechanism of the present embodiment processes deployment descriptor file (step 904) and generates a get<EJB>Keys method on the entity bean along with or alternative to the get<List> method (step 906).

Later, when the user invokes the get<EJB>Keys method on the entity bean (step 908), the mechanism of the present embodiment returns a list of primary keys for the session bean to the user (step 910) and the process terminates thereafter.

In addition to maintaining uses, owns, and ref relationships between entity and session beans, the mechanism of the present embodiment provides a container managed (CM) batch programming model for building batch applications in a J2EE environment. The programming model automatically generates code necessary for building the batch jobs in a J2EE environment.

In a preferred embodiment, when a job scheduler starts a batch job, the present embodiment accesses an XJCL definition to determine one or more batch beans to invoke. XJCL definition is an extensible markup language (XML) definition provided by the present embodiment that includes a number of job steps, classes, conditions, checkpoints, and other configuration information necessary for a batch job. From the XJCL definition, the present embodiment creates a list of batch beans needed for the batch job, for example, to calculate interests for a list of bank accounts. The present embodiment then creates a global transaction that invokes the batch beans inside a loop until a job completion indication is received, for example, until all of the interests for the list of bank accounts are calculated.

Each time the batch bean returns, the batch container determines if a checkpoint should be performed. The batch bean then uses a checkpoint to determine whether a condition is met during the process of a batch job. If a checkpoint should be performed, the batch container extracts the current cursor and commits the global transaction. The batch container then starts a new global transaction for the next job step. If additional job steps are present for the current batch job, the mechanism of the present embodiment continues to access the XJCL definition to invoke the next batch bean until all job steps are processed.

In processing job steps, the present embodiment takes a data stream as an input to a batch job. A user may specify how an entity bean can be associated with the data stream in a container managed stream (CMS) section of the deployment descriptor file. When the mechanism of the present embodiment processes the deployment descriptor file, the mechanism of the present embodiment creates a stream object for the data stream.

In addition, the mechanism of the present embodiment generates a get<Stream> and a put<Stream> method and associates them with the entity bean, such that the user may manipulate attributes of the data stream directly. From a batch perspective, several input and output streams may now be handled in a batch job using the present embodiment. Furthermore, since a CMS is a special form of CMO relationship (ownership), the get<Stream> method takes no parameters and simply returns the last stream object processed for the owning entity. In this way, a user may directly access the last record processed from thousands of records stored within the stream without a key.

Similarly, a user may specify the relationship between an owning entity bean and an owned data stream for an output data stream. In the bank statement example above, if an account requires a special statement to be printed, the batch bean may mark the account and reroute the account to a different file, such as an output data stream. Using a put<Stream> method, the mechanism of the present embodiment appends the special account to the next record in the stream object without having to perform a lookup of the last record with a key.

It should be noted that the data representing the persistent data of an output stream can be mapped to another input stream, enabling the developer to create chains of entities linked together by container managed streams. A preferred embodiment of these entities is described in CMBatch below.

In addition to getting input data streams or putting output data streams, the mechanism of the present embodiment allows developers to implement container managed uses, refs, and owns relationships between the batch bean and other necessary components in order to perform the batch job. For example, the batch bean may use a number of batchable components to access data from a database. The batch bean may also own a number of data record beans that store the records of the input data stream.

Figure 10:
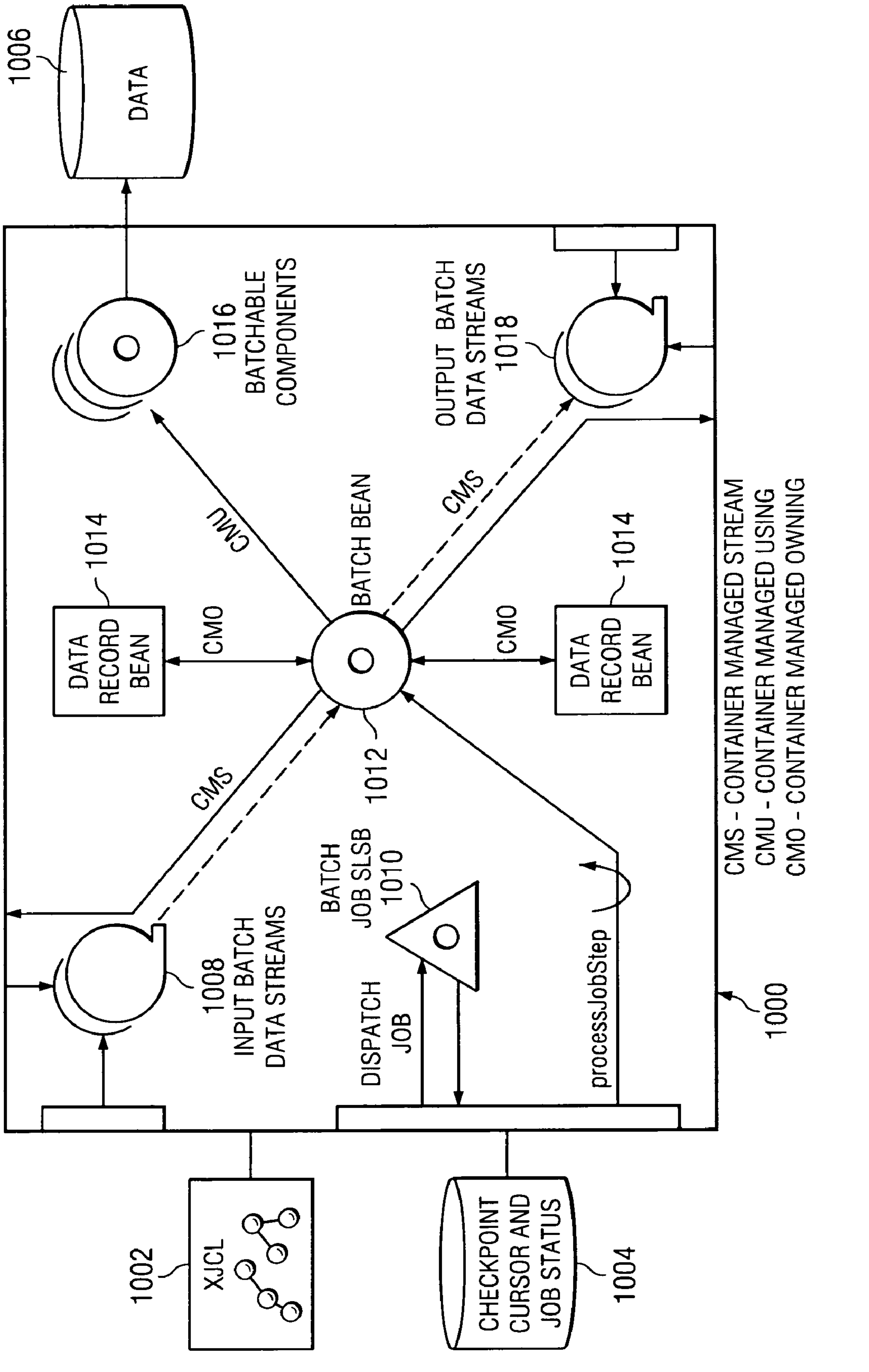
FIG. 10 is a diagram illustrating interactions of container managed batch with data streams and batch bean in accordance with a preferred embodiment of the present embodiment.

Turning now to FIG. 10, a diagram illustrating interactions of container managed batch with data streams and batch bean is depicted in accordance with a preferred embodiment of the present embodiment. As depicted in FIG. 10, container managed batch 1000 includes a number of internal and external components.

External components include XJCL 1002, check point cursor and job status 1004, and external database 1006. Internal components of CM batch include input batch data stream 1008, batch job stateless session bean 1010, batch bean 1012, data record beans 1014, batchable components 1016, and output batch data streams 1018.

Typically, when a batch job scheduler starts a batch job, the batch container accesses an XJCL definition to determine the appropriate batch bean to be invoked. If the job scheduler starts multiple batch jobs, the batch container accesses multiple XJCL definitions to determine a number of batch beans to be invoked. In addition to the batch bean, XJCL definition also defines a sequence of job steps to be taken by each batch bean, the server or pool to handle the batch job, and other configuration information for the batch job.

After the batch container invokes the batch bean, the batch container may invoke batch job stateless session bean 1010 to dispatch the job to batch bean 1012. Batch bean 1012 takes input batch data stream 1008 generated by the get<Stream> method using CM stream and performs individual job step for each record in the input data stream. For each record in the data stream, batch bean 1012 uses data record bean 1014 for storing data. In addition to input batch data stream 1008, batch bean 1012 may use batchable components 1016 to retrieve data from external database 1006.

Each time batch bean 1012 returns, the batch container determines whether a checkpoint should be performed using a checkpoint cursor and job status 1004. If checkpoint should be performed, the batch container extracts the current cursor and commits the global transaction. The batch container starts a new global transaction. If a user specifies additional job steps in the XJCL definition, the batch container accesses XJCL 1002 repeatedly to determine the next batch bean to be invoked.

During the batch process, if a record has to be written to a different location, for example, for a special account, batch bean 1012 may invoke put<Stream> method generated by CM stream and puts the record in output batch data stream 1018.

Turning now to FIG. 11, a diagram illustrating a posting step abstract class is depicted in accordance with a preferred embodiment of the present embodiment. As shown in FIG. 11, posting step entity bean uses posting step class 1100 in the batch processing to create, destroy, and process a job step. Job steps are specified in a XJCL definition, such as XJCL definition 1500 in FIG. 15.

This detailed illustrative example shows that a posting step class 1100 includes a number of methods, including createjobStep 1102, destroyJobStep 1104, and processjobStep 1106. ProcessjobStep 1106 gets the next posting object from an input data stream using getNextPosting method 1108 and identifies the transaction key of the next posting. If the transaction key is zero, ProcessJobStep 1106 calls a getAccountAccess( ).creditAccount( ) 1110 to set up a credit account for the transaction based on the account number and amount of the next posting.

GetAccountAccess( ).creditAccount( ) 1110 illustrates an example of CMU relationship specified between the AccountAccess entity bean and the CreditAccount session bean. In this case, since a relationship between AccountAccess and CreditAccount is specified, CreditAccount may be directly accessed from the Account access entity bean. Similarly, ProcessJobStep 1106 may call getAccountAccess( ).debitAccount( ) 1112 to set up a debit account for the transaction based on the account number and amount of the next posting. However, if no transaction key is found, an overdraft exception is thrown and ProcessJobStep 1106 calls a putNextOverdraft method 1113 to handle the overdraft error.

At the end of posting step class 1100, posting step class 1100 includes a number of sections defining a CMB section with a getTotalPosting method 1114, setTotalPosting method 1116; a first CMS input section with a getNextPosting method 1118; a CMS output section with a putNextOverdraft method 1120; and a CMU section with a getAccountAccess method 1122. A user may use these sections to implement container managed uses, stream, and batch in an enterprise JavaBeans™ environment.

Turning now to FIG. 12, a diagram illustrating a posting step entity bean abstract class is depicted in accordance with a preferred embodiment of the present embodiment. As shown in FIG. 12, posting step entity bean class 1200 extends posting step abstract class 1100 in FIG. 11.

Posting step entity bean class 1200 includes implementations for methods defined in the CMU, CMB, and CMS sections of posting step abstract class 1100 in FIG. 11. For example, posting step entity bean class 1200 includes a getAccountAccess method 1202, which performs the lookup of an AccountAccess based on an account name. This method is automatically generated by the mechanism of the present embodiment when the entity bean is generated. In this way, manual JNDI lookup of AccountAccess by developers is no longer required.

Another example implementation of CMS in posting step entity bean class 1200 is getNextPosting method 1204, which is a CMS method. GetNextPosting 1204 takes an input batch data stream from a posting stream config using a getBatchDataStream method 1206 and returns the next record in the posting stream to the user using a getNextRecord method 1207. The mechanism of the present embodiment generates a GetBatchDataStreamPosting method 1206 to retrieve an input stream from a data stream. Posting stream is described in further detail in FIG. 13.

Another example implementation of CMS in posting step entity bean class 1200 is a putNextOverdraft method 1208, which gets an overdraft stream from an overdraft stream config using a getBatchDataStream method 1209 and puts an overdraft value into the next record of the overdraft using a putNextRecord method 1210. Overdraft stream is described in further detail in FIG. 14.

Turning now to FIG. 13, a diagram illustrating a posting stream class is depicted in accordance with a preferred embodiment of the present embodiment. As shown in FIG. 13, posting stream class 1300 includes a getNextRecord method 1302. GetNextRecord method 1302 parses an input data stream and returns a posting object with a key, account number, and an amount from the input data stream. Thus, the mechanism of the present embodiment allows an input batch data stream to be used as input to a batch job.

Turning now to FIG. 14, a diagram illustrating a overdraft stream class and a StderrDataStream class is depicted in accordance with a preferred embodiment of the present embodiment. As shown in FIG. 14, overdraft stream class 1400 extends from StderrDataStream class 1404. Overdraft stream class 1400 includes a putNextRecord method 1402, which in turn calls a put method 1406 of StderrDataStream class 1404.

Turning now to FIG. 15A, a diagram illustrating an exemplary XJCL definition is depicted in accordance with a preferred embodiment of the present embodiment. As depicted in FIG. 15A, XJCL definition 1500 describes configuration information of a batch job.

In this example implementation, the name of the batch job is 'Testjob' 1502 and 'jndi-name' 1504 describes the location of the home interface for 'TestJob' 1502. In addition to job name and location, XJCL definition 1500 uses a 'jobscheduling-criteria' 1506 to specify which pool of application servers is used to process the batch job. Next, XJCL definition 1500 uses a step-scheduling-criteria 1508 to specify the order in which job steps are scheduled. For example, job steps may be scheduled to execute sequentially or in parallel. Sequentially means that one step is scheduled after a previous step is complete. In parallel means that two job steps may be executed at the same time.

In addition, XJCL definition 1500 uses a checkpoint-algorithm 1510 to specify a checkpoint algorithm to be used during batch processing. A checkpoint algorithm may be time-based with a preset time interval or record-based. With time-based checkpoint, the batch bean may perform a checkpoint every 5 seconds. If 1000 records may be processed in 2 seconds and a failure occurs in 6 seconds, a checkpoint at 5 seconds has already committed the first 2000 records before the failure occurs. When the batch job is restarted, the batch process may begin at record 2001 instead of record 1. With record-based checkpoint, the batch bean may perform a checkpoint every 1000 records and every 1000 records is committed. Thus, if a failure occurs at 3100, the batch process may begin at record 3001 instead of record 1.

XJCL definition 1500 uses a results-algorithm 1512 to specify a function to perform after the batch job is completed. For example, the result algorithm may calculate a job sum at the end of the batch job for a total number. Subsequently, XJCL definition 1500 includes a number of job steps, which identifies each job step to be performed for the batch job. Job-step 'Step1' 1514 includes a jndi-name, which identifies the location of the job step. Similar to TestJob 1500, job-step 'Step1' 1514 also includes a checkpoint algorithm and a result algorithm.

In addition, job-step 'Step1' 1514 includes a batch-data-stream, which specifies an input data stream that the batch bean takes as an input or an output data stream that the batch bean writes to as an output. In this example, the logical name of the output stream is 'myoutput' and the name of the class is 'PostingOutputStream.'

Job-step 'Step2' 1516 is similar to job-step 'Step1' 1514, except that job-step 'Step2' 1516 includes a step-scheduling condition 1518, which evaluates a resource-expression 'ReturnCode_Step1' to determine if it equals to 0 before scheduling job-step 'Step2' 1516.

In addition, job-step 'Step2' 1516 takes an input data stream named 'myinput' 1520 in FIG. 15B, which is a posting stream similar to posting stream 1300 in FIG. 13. Job-step 'Step2' 1516 also writes to an output data stream named 'myoutput' 1522 in FIG. 15B, which is an overdraft stream similar to overdraft stream 1400 in FIG. 14.

In summary, the present embodiment enables developers to implement container managed uses, owns, and reference relationships between entity beans and session beans without having to manually perform a lookup of the session bean home interfaces. In addition, the present embodiment provides a generic programming model for batch processing in a J2EE application environment, with the capability of inputting or outputting a data stream. Furthermore, the present embodiment provides a generic definition, XJCL definition, for specifying configuration information of a batch job, such that a number of job steps, conditions, and other necessary information for a batch job may be specified.

It is important to note that while the present embodiment has been described in the context of a fully functioning data processing system, those of ordinary skill in the art will appreciate that the processes of the present embodiment are capable of being distributed in the form of a computer readable medium of instructions and a variety of forms and that the present embodiment applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present embodiment has been presented for purposes of illustration and description, and is not intended to be exhaustive or limited to the embodiment in the form disclosed. Many modifications and variations will be apparent to those of ordinary skill in the art. The embodiment was chosen and described in order to best explain the principles of the embodiment, the practical application, and to enable others of ordinary skill in the art to understand the embodiment for various embodiments with various modifications as are suited to the particular use contemplated.

What is claimed is:

1. A method in a data processing system for implementing container managed uses, owns, and reference relationships in an enterprise JavaBeans environment, the method comprising:

detecting a first definition of a first "use" relationship between a first entity bean and a first session bean in a first deployment descriptor file, the "use" relationship specified in a container managed uses (CMU) section of the first deployment descriptor file, the "use" relationship specifying that the first entity bean uses the first session bean;

said first session bean being one of a stateless session bean, a stateful session bean, a container-managed persistent (CMP) bean, and bean-managed persistent (BMP) bean;

the first entity bean being a customer source entity bean and the first session bean being a credit card target session bean, said CMU section of the first deployment descriptor file including a specification that said customer source entity bean uses said credit card session target bean;

said CMU section including an attribute for a remote target session that indicates whether standard remote exceptions are to be passed through to a client or the first entity bean;

generating a getter method on said first entity bean, the getter method performing a manual lookup using Java Native Directory Interface (JNDI) to obtain a reference to the first session bean through a home interface;

said generating the getter method including generating a getCreditCard( ) method that performs a manual lookup using JNDI based on a key that is the home interface name and namespace of the credit card target session bean;

responsive to a first user invoking said getter method, performing a JNDI lookup of the home interface of the first session bean and returning a first session bean interface to the first user;

detecting a second definition of a second relationship between a second owning entity bean and a third owned entity bean in a second deployment descriptor file, wherein the relationship is an "owns" relationship, the "owns" relationship specified in a container managed relationship (CMR) section of the second deployment descriptor file, wherein said CMR section is used when said second deployment descriptor file is processed to recognize that said second owning entity bean owns said third owned entity bean;

responsive to processing said second deployment descriptor file, recognizing that said second owning entity bean owns said third owned entity bean and propagating key fields of said second owning entity bean transparently and automatically to said third owned entity bean;

said second owning entity bean being an order bean and said third owned entity bean being a line item bean;

responsive to processing said second deployment descriptor file, propagating an order ID of the order bean to a key of the line item bean;

in response to a subsequent deployment that said order bean is owned by a customer entity bean; propagating key fields of the customer entity bean to the order bean, and then propagating the key fields from the order bean to the line item bean;

detecting a third definition of a third "reference" relationship between a fourth referencing entity bean and a fifth plurality of referenced entity beans in a third deployment descriptor file;

in response to processing said third deployment descriptor file, generating a get<Role> method on said fourth referencing entity bean that returns a list of keys of the fifth plurality of referenced entity beans;

responsive to a second user invoking said get<Role> method, returning said list of keys to said second user, wherein only said list of keys is retrieved and no entity bean needs to be instantiated or cached;

in response to a job scheduler starting a batch job, accessing a batch definition to identify a list of batch beans to invoke;

said batch definition including a number of job steps, classes, conditions, and checkpoints that are necessary for the batch job;

said batch job being a job to calculate interests for a list of bank accounts; and creating a global transaction that invokes the list of batch beans inside a loop until a job completion indication is received that indicates all interests for the list of back accounts have been calculated.

* * * * *